United States Patent [19]

Sakai

[11] Patent Number: 4,818,125
[45] Date of Patent: Apr. 4, 1989

[54] ELECTRONIC TYPEWRITER WITH WORD CORRECTION FUNCTION INCLUDING PITCH CHANGING MEANS

[75] Inventor: Toshiyuki Sakai, Nagoya, Japan

[73] Assignee: Brother Kogyo Kabushiki Kaisha, Nagoya, Japan

[21] Appl. No.: 119,335

[22] Filed: Nov. 10, 1987

[30] Foreign Application Priority Data

Nov. 13, 1986 [JP] Japan .................................. 61-270579

[51] Int. Cl.⁴ ............................ B41J 5/00; B41J 31/09
[52] U.S. Cl. .................................. 400/63; 400/307.2; 400/697.1
[58] Field of Search ...................... 400/63, 74, 83, 293, 400/307.2, 695, 696, 697, 697.1, 705, 705.1

[56] References Cited

U.S. PATENT DOCUMENTS

| | | | |
|---|---|---|---|
| 973,844 | 10/1910 | Barney | 400/307.2 |
| 2,364,653 | 12/1944 | Pollock et al. | 400/307.2 |
| 4,136,395 | 1/1979 | Kolpek et al. | 400/63 X |
| 4,270,865 | 6/1981 | Konishi | 400/74 X |
| 4,480,931 | 11/1984 | Kamikura et al. | 400/307.2 X |
| 4,624,591 | 11/1986 | Barnes et al. | 400/307.2 X |
| 4,655,620 | 4/1987 | Adams et al. | 400/697.1 X |

FOREIGN PATENT DOCUMENTS

| | | | |
|---|---|---|---|
| 0227609 | 7/1987 | European Pat. Off. | 400/307.2 |
| 0087288 | 7/1980 | Japan | 400/307.2 |
| 0196280 | 11/1984 | Japan | 400/307.2 |
| 60-124270 | 7/1985 | Japan . | |

OTHER PUBLICATIONS

IBM Technical Disclosure Bulletin, "Multiple Pitch Alpha Numeric Display Adapter", vol. 27, No. 10B, Mar. 1985, pp. 6290-6296.

*Primary Examiner*—Ernest T. Wright, Jr.
*Attorney, Agent, or Firm*—Parkhurst, Oliff & Berridge

[57] ABSTRACT

Disclosed is an electronic typewriter with a word correction function substantially consisting of a print data memory, a correction word memory, correction determination means, selection means and correction control means. If a correction word is too long to be printed in place of an erased wrong word, the selection means is driven to select a least number of neighboring words to be erased. The correction control means controls the pitch of the correction word and its adjacent spaces before and after the word. Since the correction range can be extended to the right and left margins, a relatively long word can be automatically substituted for the erased wrong word.

3 Claims, 7 Drawing Sheets

ELECTRONIC TYPEWRITER WITH WORD CORRECTION FUNCTION INCLUDING PITCH CHANGING MEANS

BACKGROUND OF THE INVENTION

1. Field of the Invention

This invention relates to an electronic typewriter, especially to an electronic typewriter having input means for inputting character data, and erasion means for erasing a printed word.

2. Prior Art

A recent electronic typewriter includes not only a print mechanism for printing characters input from input means, but has a memory mechanism for storing those input data in a print data memory. In such a typewriter, if the printed word is somehow wrong, the word is erased by an erase mechanism and a correct word or words is printed in place of the erased word. Moreover, after the correct word is input, it is possible before printing to automatically calculate and change the pitch of the spaces before and after the correct word. One typewriter of this type has been disclosed in Japan published unexamined patent application No. 60-124270.

In this art, since only the pitch of the spaces before and after the wrong word is controlled, correction is possible if the length of the correct word is not much longer than that of the wrong one. Namely, if the length of the correct word is much longer than that of the wrong one, it is impossible to substitute the correct word for the wrong one.

As another correction method, an operator can manually control the pitch of the correct work. It is, however, a very troublesome operation, and accordingly quick correction is not possible. This method also has a limitation, i.e., the correct word which is much longer than the wrong word cannot be printed by reducing only the pitch of the correct word.

SUMMARY OF THE INVENTION

Accordingly, it is an object of the present invention to provide an electronic typewriter in which a wrong word (character string) is automatically erased and substituted by a correct word (character string), even if the length of the correct word is longer than that of the wrong one.

Figure 1:
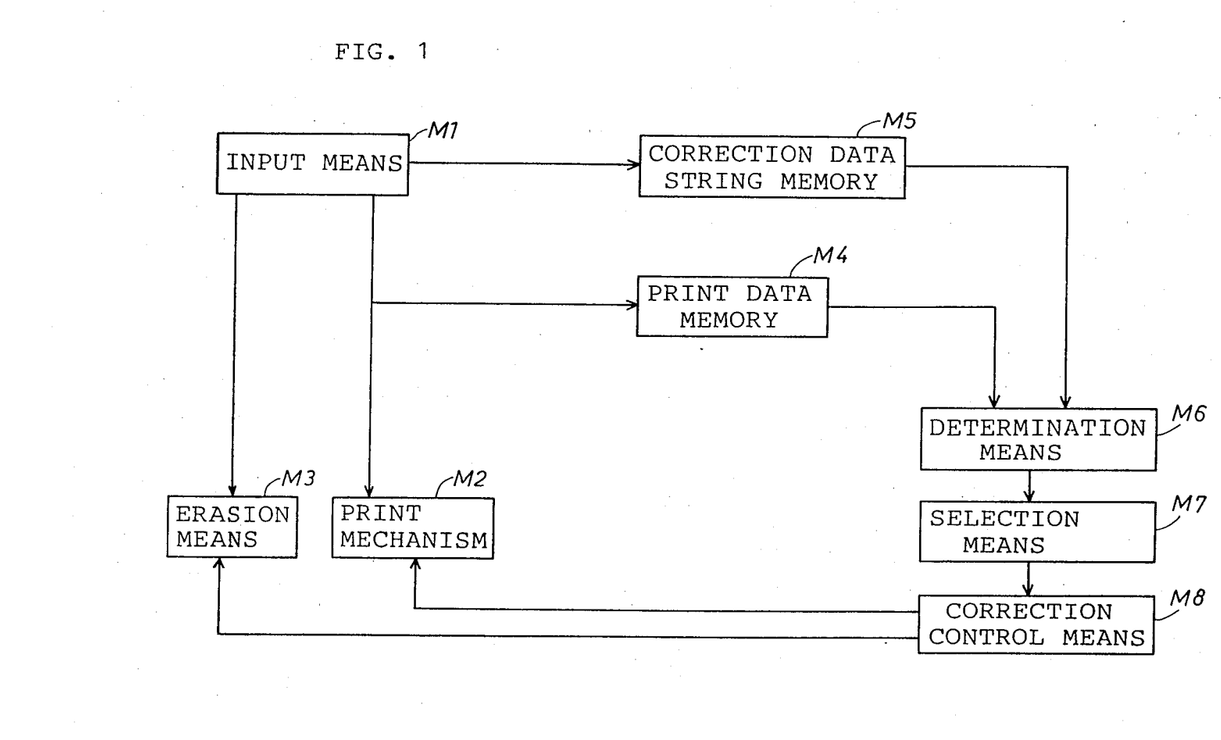
FIG. 1 is a block diagram indicating a fundamental constitution of the present invention.

To achieve this object, the present invention has a constitution set forth and as shown in FIG. 1. Namely, an electronic typewriter with an ability of correcting a printed word includes: input means M1 for inputting characters and commands; print mechanism M2 for printing a character; erasion means M3 responsive to a correction command for erasing a word printed by the print mechanism M2; print data memory M4 for storing printed characters; correction data memory M5 for storing a character string inputted in place of the word erased by the erasion means M3; determination means M6 for determining whether the character string plus one space from each side is admissible in a space of the erased word plus one space from each side when a printing pitch of the character string is reduced under the condition that characters in the character string do not overlap one another; selection means M7 for selecing a least number of neighboring words to be erased when the determination means M6 determines that the character string plus one space from each side is not admissible in the space of the erased word plus one space from each side of the erased word, the least number being a necessary number of neighboring words to be erased for admitting the character string and the erased neighboring words with a reduced printing pitch in the space of the erased word and the erased neighboring words, under a condition that characters in the character string and the erased neighboring word do not overlap one another; and correction control means M8 for driving the erasion means M3 to erase the word or words selected by the selection means M7, and for driving the print mechanism M2 to print the character string and the selected word or words with the reduced printing pitch in the space of the erased word and the erased neighboring word or erased neighboring words.

BRIEF DESCRIPTION OF THE DRAWINGS

By way of example and to make the description more clear, reference is made to the accompanying drawings in which.

DETAILED DESCRIPTION OF PREFERRED EMBODIMENT

An explanation follows of a preferred embodiment of the present invention based on the attached drawings.

Figure 2:
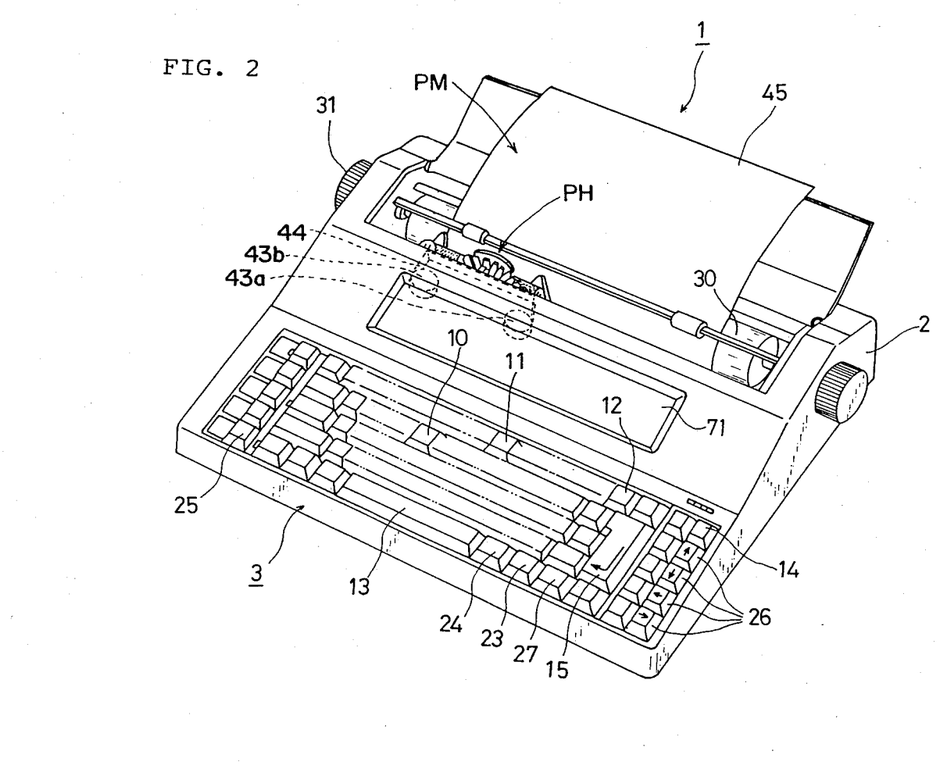
FIG. 2 is a perspective view of an electronic typewriter in an embodiment of the present invention.

As shown in FIG. 2, a keyboard 3 is provided on the front part of a body frame 2 of an electronic typewriter 1. A print mechanism, generally denoted PM, is installed behind the keyboard 3 and within the body frame 2.

The keyboard 3 comprises various keys as follows: character keys including alphabet keys 10, numeral keys 11 and symbol keys 12; a space key 13; a back space key 14; a return key 15; a paper-up key 23; a paper-down key 24; a repeat key 25; a cursor movement key 26; and a correction key 27. The functions of the above-mentioned keys and other keys are similar to those of familiar typewriters.

In the upper side of the keyboard 3, a liquid crystal display (LCD) 71 for displaying characters input by means of the above-mentioned keys 10, 11, 12 and 13 is installed.

Figure 3:
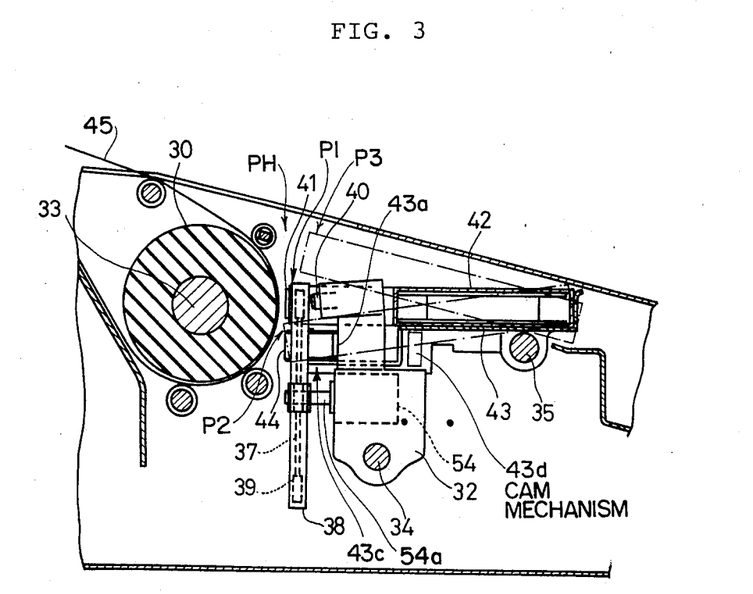
FIG. 3 is a sectional, partially schematic view of the electronic typewriter.

In the print mechanism PM, a platen 30 is provided laterally across the body frame 2. The platen 30 is driven by a platen motor 50 (FIG. 4) or manually by a platen knob 31 to feed a paper 45. As shown in Fig, 3, a carriage 32 is supported by two guide shafts 34 and 35 provided parallel to a platen shaft 33 so that the carriage 32 moves along the platen 30 in right and left directions. The carriage 32 is equipped with a type wheel motor 54 for driving a type wheel 37. The type wheel 37 is included in a wheel cassette 38 and is removably attached to the motor shaft 54a. One of type 39 of the type wheel 37 is set at a print position P1 opposite a print hammer 40. The print hammer 40 is located at the top of the carriage 32, and strikes the type 39 in the print position P1 to print it on the paper 45. A ribbon cassette 42 containing a print ribbon 41 is set on a holder 43. The front end of the holder 43 is attached to the guide shaft 35 to be rotatable with respect to the carriage 32. In a cavity 43c at the rear part of the holder 43, a correction ribbon 44 having a feed spool 43a and a take-up spool 43b is installed. To alternately select the position of the print mechanism PM from a print position P1, a pause position P2 and a correction position P3, a cam mechanism 43d (shown schematically) for moving the holder 43 is provided on the carriage 32. A position at which the print ribbon 41 is inserted between the selected character 39 and the platen 30 (see FIG. 3) is called the print position P1. Referring to the positions of holder 43 shown in dashed line in FIG. 3, a position at which the print ribbon 41 is returned from the print position P1 is called the pause position P2; and the correction position P3 is a position at which the correction ribbon 44 is inserted between the selected character 39 and the platen 30.

Figure 4:
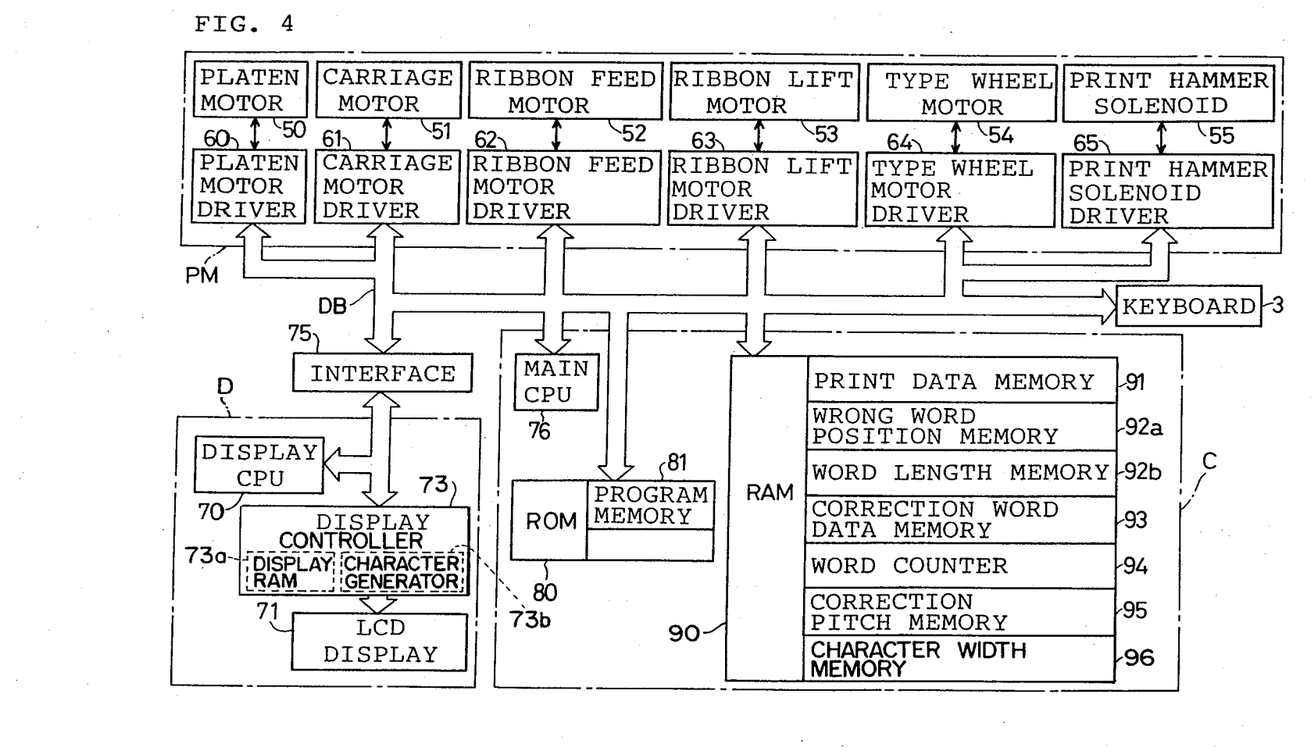
FIG. 4 is a block diagram indicating a control system of the typewriter.

The control system of the electronic typewriter 1 is hereinafter described with reference to FIG. 4.

The driving part of the print mechanism PM consists of a platen motor 50, a platen motor driver 60, a carriage motor 51, a carriage motor driver 61, a ribbon feed motor 52, a ribbon feed motor driver 62, a ribbon lift motor 53, a ribbon lift motor driver 63, the type wheel motor 54, a type wheel motor driver 64, a print hammer solenoid 55, and a print hammer solenoid driver 65. Each driver 60-65 of the print mechanism PM is connected to a control system C.

A display system D includes a display CPU 70, the LCD display 71 for displaying characters, and a display controller 73 for controlling the LCD display 71. The controller 73 has a display RAM 73a and a character generator 73b including dot pattern information for each character datum. The display CPU 70 receives command data and character data output from a main CPU 76 via an interface 75. Then, the CPU 70 forms display data according to the character generator 73b, and outputs the data to the display controller 73. The display controller 73 outputs a display signal, responsive to the display data, to the LCD display 71.

The control system C consists of the main CPU 76, and ROM 80 and RAM 90 which are connected with the CPU 76. Moreover, the keyboard 3, the drivers 60 through 65 in the print mechanism PM, and the interface 75 are all connected to the main CPU 76 by means of a data bus DB.

A program memory 81 of the ROM 80 stores a control program for controlling the motors 50 through 54, the print hammer solenoid 55 and the display system D in response to various code data input from the character keys 10, 11, 12, the space key 13, and other function keys of the keyboard 3. The memory 81 further stores a control program for controlling a pitch of a correction word and for printing it in place of an erased word.

The RAM 90 includes memories 91-96 for temporarily storing the result of calculation by the main CPU 76, a print data memory 91 for storing data of printed characters in response to the printed positions, a wrong word position memory 92a for storing the position of the wrong word, a word length memory 92b for storing the length of the wrong word, a correction word data memory 93 for storing the correction word, a word counter 94 for counting the number of words to be corrected, and a correction pitch memory 95 for storing the pitch of the correction word or words.

The main CPU 76 receives code data responsive to characters such as alphabet, numerals and symbols input from the keyboard 3, and controls the print mechanism PM to print the corresponding characters on the paper 45 based on the control program. When the correction key 27 is operated, the main CPU 76 controls the print mechanism PM to automatically erase the characters of the printed word at the print head PH based on the data of the print data memory 91. When the wrong word is erased by operating the correction key 27, the pitch of the correction word or words to be printed in place of the erased word is automatically controlled, as described hereinafter.

Figure 5A:
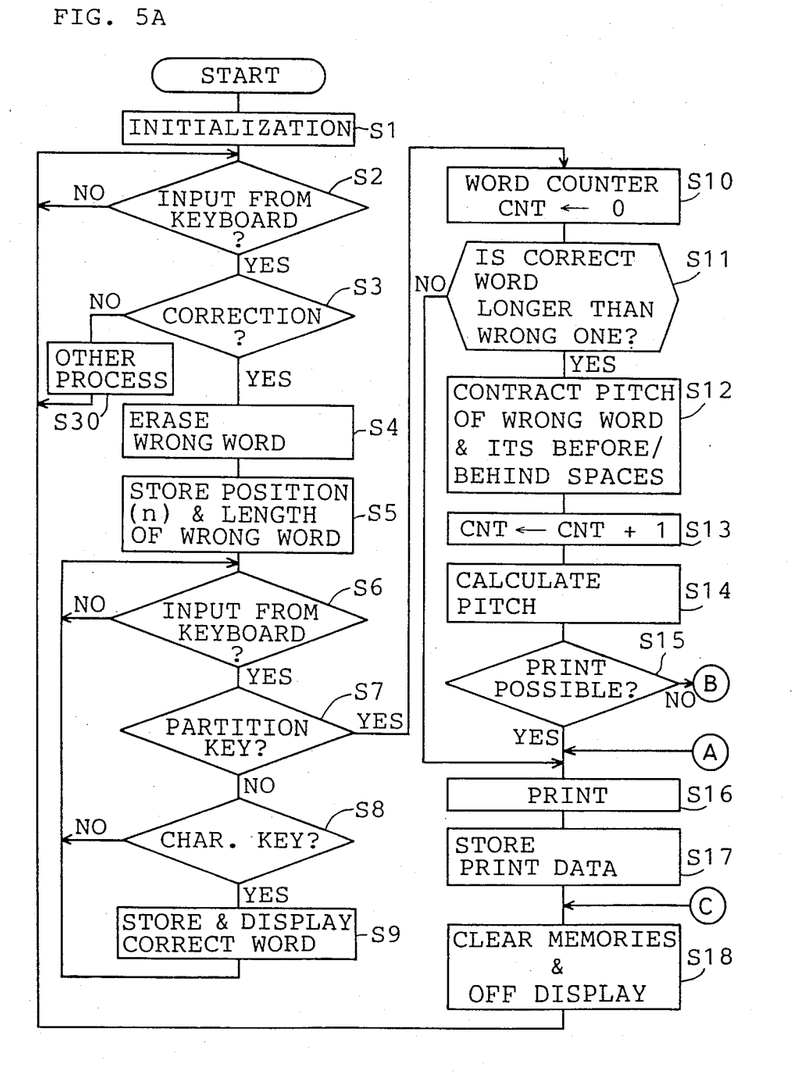
FIGS. 5A and 5B are flowcharts of a control routine executed in the control system of the typewriter.
Figure 5B:
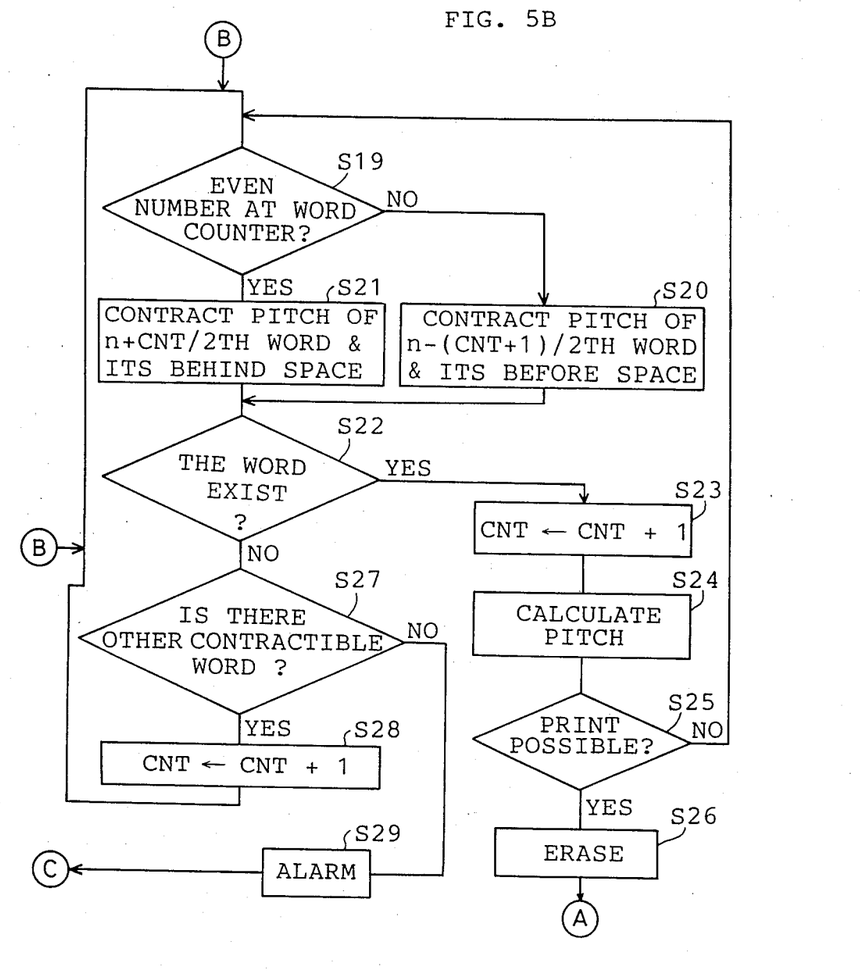

A description follows of controls and actions executed in the present embodiment based on the flowcharts of FIGS. 5A and 5B.

The control routine is started when the power is supplied to the typewriter 1. At step S1 (steps are hereinafter referred to as S), initialization is executed, i.e., the control program is read out from the ROM 80 by the main CPU 76.

At S2, it is determined whether or not a key is operated. When the answer is YES, the process step proceeds to S3, at which it is determined whether the correction key 27 is operated. If the answer is NO, the process step proceeds to S30. At S30, operations responsive to the key input is executed in the same manner as a conventional typewriter. Namely, a string of characters is printed on a paper 45 by the print mechanism PM at a predetermined pitch (e.g., P1) based on a key operation. The print data (character code, space code, pitch code, paragraph renewal code, form feed code, etc.) are stored in the print data memory 91. After the operation at S30 is finished, the program returns to S2.

Figure 6A:
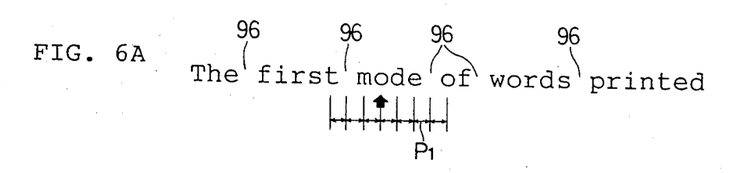
FIGS. 6A, 6B and 6C illustrate correction examples.
Figure 6B:
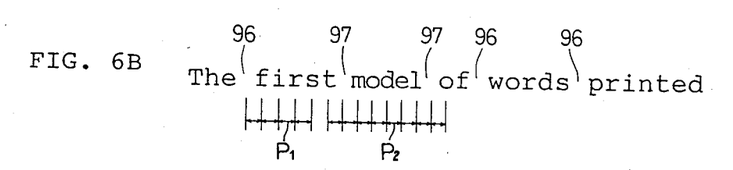
Figure 6C:
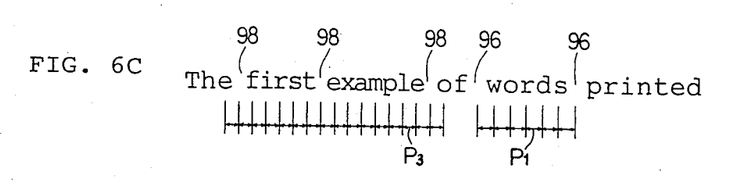

When a wrong word is found in the document which is already input and printed, an operator moves the carriage 32 to place its print head PH at the position of the corresponding word by operating the backspace key 14 or the paper-back key 24. An example is shown in FIGS. 6A, 6B and 6C. In the figures, numerals 96, 97 and 98 indicate spaces between words. The space 97 is smaller than the space 96 and is larger than the space 98 (i.e., space 96>space 97>space 98). In FIG. 6A, if the word 'mode' needs correction, the print head PH of the carriage 32 is set at any character (shown by the arrow) of the word. At this time, the correction key 27 is operated, and the process step proceeds from S3 to S4. At S4, the word designated by the print head PH is erased by a known method. Thus, the word 'mode' is erased. At the subsequent S5, the position and the length of the wrong word is stored in the wrong word position memory 92a and the word length memory 92b, respectively. To elaborate, the word's order n counted from the initial position of the line is then stored in the wrong word position memory 92a based on the data in the print data memory 91.

At S6, it is determined whether there is any input from the keyboard 3. When the answer is YES, the program proceeds to S7. At this step, it is determined whether a word partition key (indicating space, period, comma, semicolon, or colon, etc.) is operated at S6. If the partition key is operated, it means that the input of the correction word is completed. If the answer is NO at S7, it is determined that the input of the word has not been finished yet, and the program proceeds to S8. At S8, it is determined whether the character key 10 or 11 is operated. If the answer is NO, the program returns to S6, while if YES, it proceeds to S9. At S9, the input data is stored in the correction word data memory 93 and displayed on the display unit 71. Then, the program returns to S6. The loop from S6 to S9 is repeated so that the correction word is stored in the correction word data memory 93 and then displayed on the display unit 71. When the input of the correction word is completed, any partition key such as space key 13 is operated, and the program jumps from S7 to S10.

At S10, the value of the word counter 94 is reset to 0, and the program proceeds to S11. At S11, it is determined whether the length of the correction word is longer than that of the wrong word stored in the print data memory 91. If the answer is NO, the program proceeds to S16. At S16, a correction word is printed in place of the erased word 'mode' at the same pitch P1. If the correction word is shorter than 'mode', the extra space is kept as a space 96. At S17, the wrong word data stored in the print data memory 91 is replaced by the correction word data. At subsequent S18, the wrong word position memory 92a, the word length memory 92b the correction word data memory 93, and the display 71 are cleared. Then the program returns to S2.

When it is determined at S11 that the length of the correction word is longer than that of the wrong word, e.g., when 'mode' is replaced by 'model', the program proceeds to S12. At S12, it is determined to reduce the pitch of the correct word 'model' and the adjacent spaces 96 before and after the word. At the subsequent S13, the value of the word counter 94 is incremented by 1, and the correction pitch is calculated at S14. Namely, the correction pitch P2 ( P1>P2, ref: FIG. 6B) is calculated to substitute 'model' for 'mode' with equal intervals. The calculated pitch P2 is stored in the correction pitch memory 95. At S15, it is determined whether the correction word can be printed without the characters overlapping one another. To elaborate, the width of the characters in various types such as pica, elite and micron is read out from ROM 80. Then, it is compared with the correction pitch P2 to determine whether the correction word can be printed without overlapping occurring. It is also possible to previously input the character width data to the character width memory 96 of the RAM 90.

In the present embodiment, it is determined at S15 that 'model' can be printed within the length of 'mode' by controlling the pitch. Then, at S16, 'model' is printed in place of the erased 'mode' (FIG. 6A) by the pitch P2 stored in the correction pitch memory 95 as shown in FIG. 6B. The program proceeds to S17, S18, and returns to S2.

In the case that 'mode' is replaced by 'example', the same process loop from S12 to S14 is executed. At S15, however, it is determined that 'mode' cannot be replaced by 'example' without character overlap within 'example', even with minimized correction pitch. Since the answer at S15 is NO, the process step proceeds to S19.

At S19, it is determined whether the value CNT of the word counter 94 is an even number. At the present state, since the value CNT has been set to 1 at S13, the program proceeds to S20. At S20, the value n−(CNT+1)/2 is calculated and it is determined that the pitch of the n−(CNT+1)/2th word and its adjacent spaces 96 before and after the word are to be reduced. Namely, when CNT is an odd number, the pitch of the word before (left side of) the wrong word is reduced. On the other hand, when CNT is an even number, the pitch of the word after (right side of) the wrong word is reduced. In FIG. 6A, for example, the pitch of the (n−1)th word 'first' is controlled. At S22, it is determined whether a word exists at the position determined at S20. Since the word 'first' exists there in the present example, the program proceeds to S23 and S24. At S23 and S24, the operations identical to S13 and S14 are executed. At S25, it is determined that the 'first' and 'example-' can be printed by modifying the pitches of 'mode' and 'first'. Accordingly, the answer at S25 is YES, and the program proceeds to S26. A S26, the (n−1)th word, i.e., 'first' is erased, and the process step returns to S16. At this step, 'first' and 'example' are printed at the pitch P3 (P2>P3) as shown in FIG. 6C. Then, the program proceeds to S17 and S18, and returns to S2.

If the correction word is still longer than 'example', an additional word will be erased and reprinted with a reduced pitch. For example, if the program proceeds from S19 to S20, S22 and S25, and then returns to S19 under the condition that the value CNT of the counter 94 is 1, the value CNT becomes 2, so the program proceeds to S21. At S21, the value (n+CNT/2) is calculated and the pitch of the n+CNT/2th word and its adacent spaces 96 is reduced. In FIG. 6A, for example, the pitch of 'words' is modified.

The operations at S20 and S21 are repeated until the answer at S25 becomes YES. Thus, the words are erased in turn from the nearest word out. If the correction range extends to either the right margin or the left margin, the answer becomes NO at S22, and the program proceeds to S27. At S27, it is determined whether there is any word to be erased even if the correction range extends to either the right or the left margin. If the answer is YES at S27, the program proceeds to S28 at which the value CNT of the word counter 94 is incremented by 1, and the program returns to S19. The correction range is alternatively changed from the right side to left side or the left side to the right side in relation to the wrong word. If it is determined at S27 that the correction is impossible even by controlling the pitches of all words in the line, the wrong word is not replaced by the correction word. In this case, the program proceeds to S29 at which the alarm processing is executed, and the program returns to S2 via S18.

When the wrong word cannot be replaced by the correction word due to the above-mentioned condition, it is possible to exchange the type wheel 37 with another one having smaller characters and to restart the above-mentioned process routine.

While the invention has been particularly shown and described with reference to a preferred embodiment, it will be understood by those skilled in the art that various other changes in form and detail may be made without departing from the spirit and scope of the invention. For example, the present invention can be available to electronic typewriters with a thermal printer or a ball type printer, having erasion means.

What is claimed is:

1. An electronic typewriter with an ability of correcting a printed word, comprising:
   input means for inputting characters and commands;
   print means for printing a character;
   erasion means responsive to a correction command for erasing a word printed by the print means;
   print data memory for storing printed characters;
   correction data memory for storing a character string inputted in place of the word erased by the erasion means;
   determination means for determining whether the character string plus one space from each side of the character string is admissible in a space of the erased word plus one space from each side of the erased word when a printing pitch of the character string is reduced under the condition that characters in the character string do not overlap one another;

selection means for selecting a least number of neighboring words to be erased when the determination means determines that the character string plus one space from each side of the character string is not admissible in the space of the erased word plus one space from each side of the erased word, the least number being a necessary number of neighboring words to be erased for admitting the character string and the erased neighboring words with a reduced printing pitch in the space of the erased word and the erased neighboring words, under a condition that characters in the character string and the erased neighboring words do not overlap one another; and correction control means for driving the erasion means to erase the word or words selected by the selection means and for driving the print means to print the character string and the selected word or words with the reduced printing pitch in the space of the erased word and the erased neighboring word or erased neighboring words.

2. The electronic typewriter according to claim 1 wherein the determination means comprises:

pitch calculation means for calculating a reduced printing pitch of the character string so that the character string plus one space from each side of the character string is admissible in the space of the erased word plus the one space from each side of the erased word; and comparison means for comparing the calculated pitch with a character width of the character string.

3. The electronic typewriter according to claim 2 wherein the selection means comprise:

first selection means for selecting one of the most neighboring words to the erased word;

second pitch calculation means for calculating a pitch of an extended character string which is composed of the character string, the word selected by the first selection means and a space therebetween when the extended character string plus one space from each side of the extended character string is admissible in the space of an extended space which is composed of the space of the erased word, the selected word, the space therebetween and one space from each side of the extended character string and the erased word;

second comparison means for comparing the calculated pitch with the character width of the extended character string; and second selection means for selecting another neighboring word when the calculated pitch is smaller than the character width of the extended character string.

* * * * *